(12) United States Patent
Kanemitsu et al.

(10) Patent No.: US 8,154,629 B2
(45) Date of Patent: Apr. 10, 2012

(54) NOISE CANCELING CIRCUIT, NOISE CANCELING METHOD, AND SOLID-STATE IMAGING DEVICE

(75) Inventors: Shiroshi Kanemitsu, Kanagawa (JP);
Junichi Hosokawa, Kanagawa (JP);
Kazuhiro Tabuchi, Kanagawa (JP);
Takaaki Kawakami, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 428 days.

(21) Appl. No.: 12/554,409

(22) Filed: Sep. 4, 2009

(65) Prior Publication Data
US 2010/0085447 A1 Apr. 8, 2010

(30) Foreign Application Priority Data
Oct. 7, 2008 (JP) ................... 2008-260409

(51) Int. Cl.
*H04N 9/64* (2006.01)
*H04N 5/208* (2006.01)
*G06K 9/40* (2006.01)
(52) U.S. Cl. ......... 348/241; 348/252; 382/261; 382/266
(58) Field of Classification Search .................. 348/241, 348/252; 382/254, 260–266, 275
See application file for complete search history.

(56) References Cited

U.S. PATENT DOCUMENTS
6,167,164 A * 12/2000 Lee ............................. 382/261
6,985,636 B1 * 1/2006 Semenchenko ............... 382/266
8,000,549 B2 * 8/2011 Lee et al. ...................... 382/254
8,059,912 B2 * 11/2011 Liaw et al. .................... 382/266
2005/0185071 A1 * 8/2005 Takahashi et al. ............ 348/254

FOREIGN PATENT DOCUMENTS
JP 2006-20050 1/2006

OTHER PUBLICATIONS
U.S. Appl. No. 12/485,381, filed Jun. 16, 2009, Junichi Hosokawa et al.

* cited by examiner

Primary Examiner — Timothy J Henn
(74) Attorney, Agent, or Firm — Oblon, Spivak, McClelland, Maier & Neustadt, L.L.P.

(57) ABSTRACT

A noise canceling circuit that includes a sharp/flat-part determining unit that determines whether a neighborhood of a target pixel in a digital video signal is a sharp part or a flat part by calculating a sharpness value indicating sharpness and an approximate noise value approximately indicating a noise value included in the target pixel based on pixel values of the target pixel and a predetermined number of pixels inputted immediately before and after the target pixel, and comparing the sharpness value and the approximate noise value, a noise extracting unit that extracts the noise value of the target pixel by performing a noise extraction corresponding to a result of the determination performed by the sharp/flat-part determining unit, and a correcting unit that corrects the pixel value of the target pixel by using the extracted noise value of the target pixel.

20 Claims, 8 Drawing Sheets

NOISE CANCELING CIRCUIT, NOISE CANCELING METHOD, AND SOLID-STATE IMAGING DEVICE

CROSS-REFERENCE TO RELATED APPLICATIONS

This application is based upon and claims the benefit of priority from the prior Japanese Patent Application No. 2008-260409, filed on Oct. 7, 2008; the entire contents of which are incorporated herein by reference.

BACKGROUND OF THE INVENTION

1. Field of the Invention

The present invention relates to a noise canceling circuit, a noise canceling method, and a solid-state imaging device.

2. Description of the Related Art

A typical solid-state imaging device (camera), which is mounted on a digital still camera (DSC), a mobile phone, or the like to output digital video, converts an analog signal of a subject image focused through an imaging lens on an image pickup device into a digital video signal using an analog-digital converter (ADC). An image processor incorporated in the camera performs lens shading, defect correction, noise canceling, and the like for the obtained digital video signal, and outputs a final digital video signal.

With recent reduction in pixel size, decrease in a signal-to-noise (S/N) ratio of a video signal outputted from an image pickup device has become noticeable. Deterioration in calculation accuracies of the various types of processing in the image processor due to noise in the video signal outputted from the image pickup device has become an issue. To resolve the issue, another circuit performing noise canceling can be further provided at a first stage in the image processor that performs the various types of typical processing as described above to remove noise in an imaging signal from the image pickup device.

However, the noise canceling circuit typically provided in the image processor uses a two-dimensional filter and thus has a line memory (for example, see Japanese Patent Application Laid-open No. 2006-20050). Accordingly, when the noise canceling circuit is provided at the first stage in the image processor, the circuit scale and the power consumption are increased. If the noise canceling is performed based on a one-dimensional array of pixels without using the line memory, it is difficult to distinguish between noise and a sharp part in which contrast information sharply changes. Therefore, the sharp part is also attenuated by the noise canceling, which provides a reduced sense of resolution and a deteriorated image quality.

BRIEF SUMMARY OF THE INVENTION

A noise canceling circuit according to an embodiment of the present invention comprises:

a sharp/flat-part determining unit that determines whether a neighborhood of a target pixel in the digital video signal is a sharp part or a flat part by calculating a sharpness value indicating sharpness and an approximate noise value approximately indicating a noise value included in the target pixel, based on pixel values of the target pixel and a predetermined number of pixels inputted immediately before and after the target pixel, and comparing the sharpness value and the approximate noise value;

a noise extracting unit that extracts the noise value of the target pixel by selecting one of two noise extractions each using a one-dimensional filter according to a result of the determination performed by the sharp/flat-part determining unit and performing the selected noise extraction to the target pixel and the predetermined number of the pixels inputted immediately before and after the target pixel; and a correcting unit that corrects the pixel value of the target pixel by using the extracted noise value of the target pixel.

A noise canceling method according to an embodiment of the present invention comprises:

calculating a sharpness value indicating sharpness and an approximate noise value approximately indicating a noise value included in the target pixel, based on pixel values of a target pixel in the digital video signal and a predetermined number of pixels inputted immediately before and after the target pixel;

determining whether a neighborhood of the target pixel is a sharp part or a flat part by comparing the sharpness value and the approximate noise value;

extracting the noise value of the target pixel by selecting one of two noise extractions each using a one-dimensional filter according to whether the neighborhood of the target pixel is a sharp part or a flat part, and performing the selected noise extraction to the target pixel and the predetermined number of the pixels inputted immediately before and after the target pixel; and correcting the pixel value of the target pixel by using the extracted noise value of the target pixel.

A solid-state imaging device according to an embodiment of the present invention comprises:

a first noise canceling circuit that is provided at a first stage of the image processor to sequentially perform noise canceling of pixel values of the digital video signal; and a second noise canceling circuit that is provided at a subsequent stage to the first noise canceling circuit to store the pixel values of the digital video signal inputted through the first noise canceling circuit in a line memory, and to perform noise canceling of the stored pixel values by using a two-dimensional filter, wherein the first noise canceling circuit comprises:

a sharp/flat-part determining unit that determines whether a neighborhood of a target pixel in the digital video signal is a sharp part or a flat part by calculating a sharpness value indicating sharpness and an approximate noise value approximately indicating a noise value included in the target pixel, based on pixel values of the target pixel and a predetermined number of pixels inputted immediately before and after the target pixel, and comparing the sharpness value and the approximate noise value;

a noise extracting unit that extracts the noise value of the target pixel by selecting one of two noise extractions each using a one-dimensional filter according to a result of the determination performed by the sharp/flat-part determining unit and performing the selected noise extraction to the target pixel and the predetermined number of the pixels inputted immediately before and after the target pixel; and a correcting unit that corrects the pixel value of the target pixel by using the extracted noise value of the target pixel.

DETAILED DESCRIPTION OF THE INVENTION

Exemplary embodiments of a noise canceling circuit, a noise canceling method, and a solid-state imaging device according to the present invention will be explained below in detail with reference to the accompanying drawings. The present invention is not limited to the embodiments.

Figure 1:
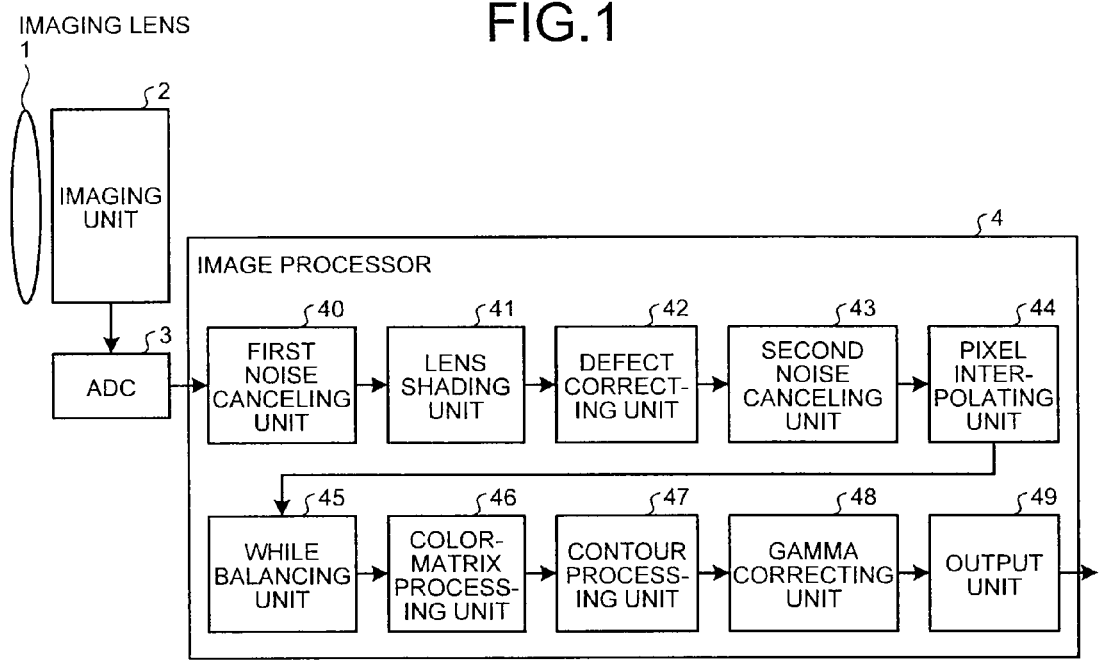
FIG. 1 is a block diagram of a configuration of a solid-state imaging device according to a first embodiment of the present invention.

FIG. 1 is a block diagram of a configuration of a solid-state imaging device according to a first embodiment of the present invention. The solid-state imaging device includes an imaging lens 1, an imaging unit 2, an ADC 3, and an image processor 4.

The imaging lens 1 captures light from a subject. The imaging unit 2 images the light incident on the imaging lens 1. In the imaging unit 2, an image sensor (or an image pickup device, not shown) captures red, blue, and green pixel values in an order corresponding to Bayer arrangement, then sequentially amplifies the captured analog video signal with a gain according to imaging conditions externally specified, and outputs the amplified signal. The ADC 3 converts the analog video signal outputted from the imaging unit 2 into a digital video signal. The image processor 4 subjects the digital video signal outputted from the ADC 3 to processing that enables the digital video signal to be linearly reflected on human eyes, that is, image processing for bringing the digital video signal closer to a scene seen by a person.

The image processor 4 includes a first noise canceling unit (noise canceling circuit) 40, a lens shading unit 41, a defect correcting unit 42, a second noise canceling unit 43, a pixel interpolating unit 44, a while balancing unit 45, a color-matrix processing unit 46, a contour processing unit 47, and a gamma correcting unit 48. The image processor 4 further includes an output unit 49 that outputs a digital video signal obtained by the image processing.

The first noise canceling unit 40 removes signals different from a signal of the subject, such as shot noise, from the digital video signal outputted from the ADC 3 at a first stage in the image processor 4 to enhance calculation accuracies in processing of the units at the subsequent stages. The first noise canceling unit 40 does not use a line memory to reduce the circuit scale and the power consumption, and sequentially performs noise canceling for the pixel values of the digital video signal transmitted in the order corresponding to the Bayer arrangement. That is, the first noise canceling unit 40 performs the noise canceling based on a one-dimensional array of the pixel values in an image frame of the digital video signal. A configuration and an operation of the first noise canceling unit 40 are explained in detail later.

The lens shading unit 41 performs electrical shading correction by multiplying the digital video signal subjected to the noise canceling in the first noise canceling unit 40 by a correction factor individually determined according to a position of the corresponding pixel (from which pixel in the image pickup device the signal is taken).

The defect correcting unit 42 performs defect correction for the digital video signal subjected to the shading correction by the lens shading unit 41 to correct a defective part (defect) in the digital video signal due to a pixel that is not normally functioning in the image pickup device.

The second noise canceling unit 43 performs again noise canceling for the digital video signal subjected to the defect correction by the defect correcting unit 42. The second noise canceling unit 43 uses a line memory. The second noise canceling unit 43 temporarily stores the pixel values of the digital video signal transmitted in the order corresponding to the Bayer arrangement in the line memory, and performs noise canceling for the stored pixel values based on a two-dimensional array of the pixels by using a two-dimensional filter, or the like.

The pixel interpolating unit 44 performs pixel interpolation (demosaicing) for the pixel values of the digital video signal subjected to the noise canceling by the second noise canceling unit 43 and transmitted in the order corresponding to the Bayer arrangement.

The white balancing unit 45 performs white balancing for the digital video signal demosaiced by the pixel interpolating unit 44.

The color-matrix processing unit 46 performs a color matrix operation (color reproduction) for the digital video signal subjected to the white balancing by the white balancing unit 45 to provide color reproducibility.

The contour processing unit 47 performs edge enhancement for the digital video signal subjected to the color reproduction in the color-matrix processing unit 46 by using a correction factor calculated based on the imaging conditions and the position of each pixel in the imaging unit 2.

The gamma correcting unit 48 performs gamma correction for the digital video signal edge enhanced by the contour processing unit 47.

The output unit 49 outputs the digital video signal subjected to the gamma correction by the gamma correcting unit 48 as a final digital video signal (corrected digital video signal) to outside.

Figure 2:
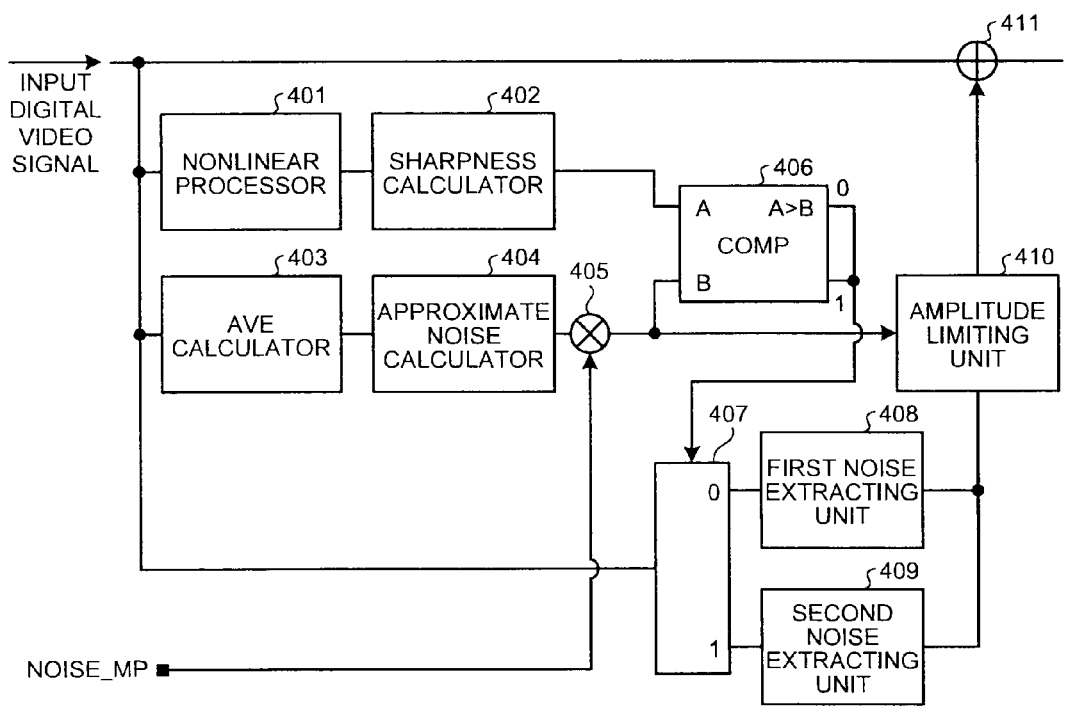
FIG. 2 is a block diagram of a configuration of a first noise canceling unit according to the first embodiment.

The first noise canceling unit 40 that is a relevant part of the first embodiment is explained next in detail. A configuration of the first noise canceling unit 40 is explained with reference to FIG. 2. FIG. 2 is a block diagram of a configuration of the first noise canceling unit 40. As shown in FIG. 2, the first noise canceling unit 40 includes a nonlinear processor 401, a sharpness calculator 402, an average (Ave) calculator 403, an approximate noise calculator 404, a multiplier 405, a comparator 406, a multiplexer 407, a first noise extracting unit 408, a second noise extracting unit 409, an amplitude limiting unit 410, and an adder 411.

In the following explanations, it is assumed that the constituent elements of the first noise canceling unit 40 perform the noise canceling based on two closest pixels transmitted immediately before a target pixel among the pixels of the digital signal transmitted in the order corresponding to the Bayer arrangement and having the same color as that of the target pixel, and two closest pixels transmitted immediately after the target pixel and having the same color. The four pixels of the same color, which are close before and after the target pixel, to be used in the noise canceling for the target pixel are referred to simply as "four close pixels". The number of pixels to be used in the noise canceling among the pixels inputted before and after the target pixel can be any value other than two.

Figure 3:
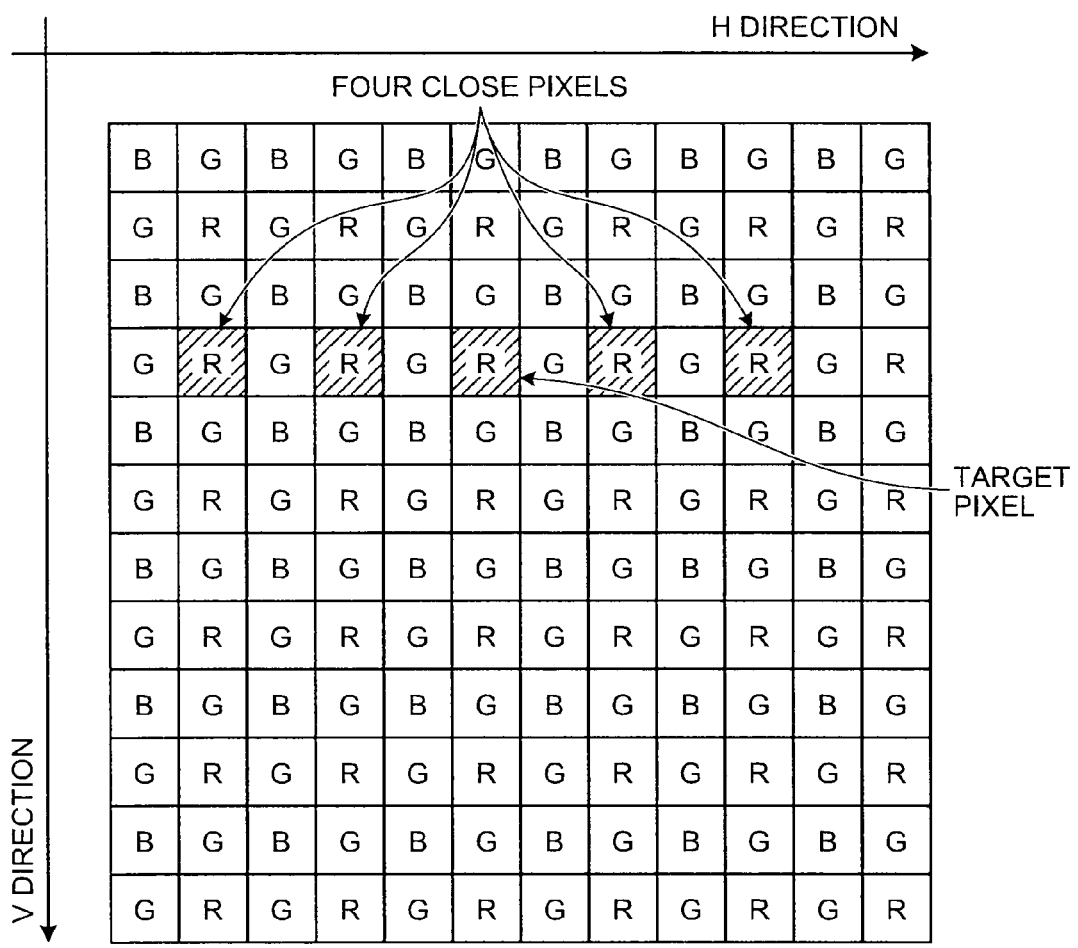
FIG. 3 is a schematic diagram for explaining a configuration of an image frame.

FIG. 3 is an example of an image frame in the Bayer arrangement transmitted to the first noise canceling unit 40. In FIG. 3, "R" denotes a red pixel, "G" denotes a green pixel, and "B" denotes a blue pixel. As shown in FIG. 3, an image frame includes the blue and green pixels which are alternately arranged in odd lines, and the green and red pixels which are alternately arranged in even lines. The digital video signal is inputted pixel by pixel toward the right end in an H direction of FIG. 3. When a pixel at the right end is reached, the digital video signal is then inputted from a pixel at the left end in a line just below in a V direction. As shown in FIG. 3, when a red pixel is a target pixel, two red pixels on the right of the target pixel inputted immediately after the target pixel and two red pixels on the left of the target pixel inputted immediately before the target pixel are the four close pixels. Each pixel is set as the target pixel in turn in the order of pixel values inputted to the first noise canceling unit 40.

The nonlinear processor 401, the sharpness calculator 402, the Ave calculator 403, the approximate noise calculator 404, the multiplier 405, and the comparator 406 function as a sharp/flat-part determining unit that determines whether a neighborhood of the target pixel is a sharp part in which color or luminance change is sensed sharp when seen by a person, or a flat part in which the color or luminance change is sensed not sharp but flat.

The nonlinear processor 401 performs nonlinear processing to nonlinearly convert pixel values of the target pixel and the four close pixels with respect to the target pixel based on a predetermined spectral luminous efficiency so that the sharpness calculator 402 at a subsequent stage can calculate a sharpness value by quantifying a level of sharpness with a sense close to that seen by a person. The sharpness calculator 402 calculates an absolute value of a difference between the target pixel and each of the four close pixels after the nonlinear processing performed by the nonlinear processor 401, and outputs an average of the four calculated absolute values as the sharpness value. The sharpness value thus outputted is larger when a degree of sharpness seen by a person is larger, for example when the target pixel and the four close pixels include a part like a boundary between objects having different colors (edge part). In this example, the average of the absolute values of the differences between the target pixel and each of the four close pixels is used as the sharpness value as is. However, a value obtained by further performing an operation to the average can be used as the sharpness value.

The Ave calculator 403 calculates an average of the target pixel and the four close pixels, a total of five pixels. The approximate noise calculator 404 calculates an approximate noise value approximately indicating a level of noise included in the target pixel based on the average calculated by the Ave calculator 403. The approximate noise calculator 404 can apply any method to calculate the approximate noise value. Because it is known that a standard deviation of shot noise that increases with reduction in the pixel size and a square root of an average of pixel values generally have a linear relation, a square root of the average calculated by the Ave calculator 403 can be used as the approximate noise value. A value obtained by further performing an operation to the square root can be used as the approximate noise value. It is also possible to previously obtain shot noise characteristics specific to the image pickup device used in the imaging unit 2, and calculate an approximate noise value based on the shot noise characteristics and the average calculated by the Ave calculator 403. The multiplier 405 multiplies the approximate noise value calculated by the approximate noise calculator 404 by a noise factor (Noise_MP) previously provided by a setting register or the like, thereby adjusting the approximate noise value calculated by the approximate noise calculator 404.

The comparator 406 compares the sharpness value calculated by the sharpness calculator 402 and the approximate noise value adjusted by the multiplier 405. When the sharpness value is larger than the approximate noise value, the comparator 406 determines that the target pixel and the four close pixels are a sharp part, and sets a predetermined flag to 0 (zero), which is used later as a selection signal for selecting one of the noise extracting units 408 and 409 to be used. When the sharpness value is equal to or smaller than the approximate noise value, it implies that the target pixel and the four close pixels do not have significant sharpness with respect to the shot noise. Accordingly, the comparator 406 determines that the target pixel and the four close pixels are a flat part and sets the flag to 1.

The multiplexer 407, the first noise extracting unit 408, and the second noise extracting unit 409 function as a noise extracting unit.

The first and second noise extracting units 408 and 409 each extract a more precise noise value than the approximate noise value to be used for correction of the target pixel by using a one-dimensional noise extraction filter. The first and second noise extracting units 408 and 409 use noise extraction filters having different characteristics. For example, the first noise extracting unit 408 can use a noise extraction filter having characteristics like those of a low-pass filter to keep the sharpness as much as possible, and the second noise extracting unit 409 can use a noise extraction filter having such characteristics that pixel values of wider frequency components than the first noise extracting unit 408 are flattened. The multiplexer 407 determines which one of the noise extracting units 408 and 409 is to be used for calculation of a noise value used in the noise canceling for the target pixel based on a result of the comparison by the comparator 406, and transmits the pixel values of the target pixel and the four close pixels to the selected one of the noise extracting units. That is, when the predetermined flag indicates zero, it implies that the neighborhood of the target pixel is a sharp part, and accordingly the multiplexer 407 transmits the pixel values of the target pixel and the four close pixels to the first noise extracting unit 408, which uses the noise extraction filter having such characteristics that the sharpness is kept as much as possible. When the predetermined flag indicates 1, it implies that the neighborhood of the target pixel is a flat part, and accordingly the multiplexer 407 transmits the pixel values of the target pixel and the four close pixels to the second noise extracting unit 409, which uses the noise extraction filter having such characteristics that pixel values of wider frequency components than the first noise extracting unit 408 are flattened.

The amplitude limiting unit 410 and the adder 411 function as a correcting unit that corrects the pixel value of the target pixel using the noise value extracted by the noise extracting unit 408 or 409. That is, the amplitude limiting unit 410 performs amplitude limitation on the noise value extracted by the first noise extracting unit 408 or 409 based on the approximate noise value adjusted by the multiplier 405 to prevent overcorrection. The adder 411 adds the noise value amplitude limited by the amplitude limiting unit 410 to the pixel value of the target pixel. The first noise canceling unit 40 outputs the pixel value of the target pixel outputted by the adder 411 as the pixel value subjected to the noise canceling.

Figure 4:
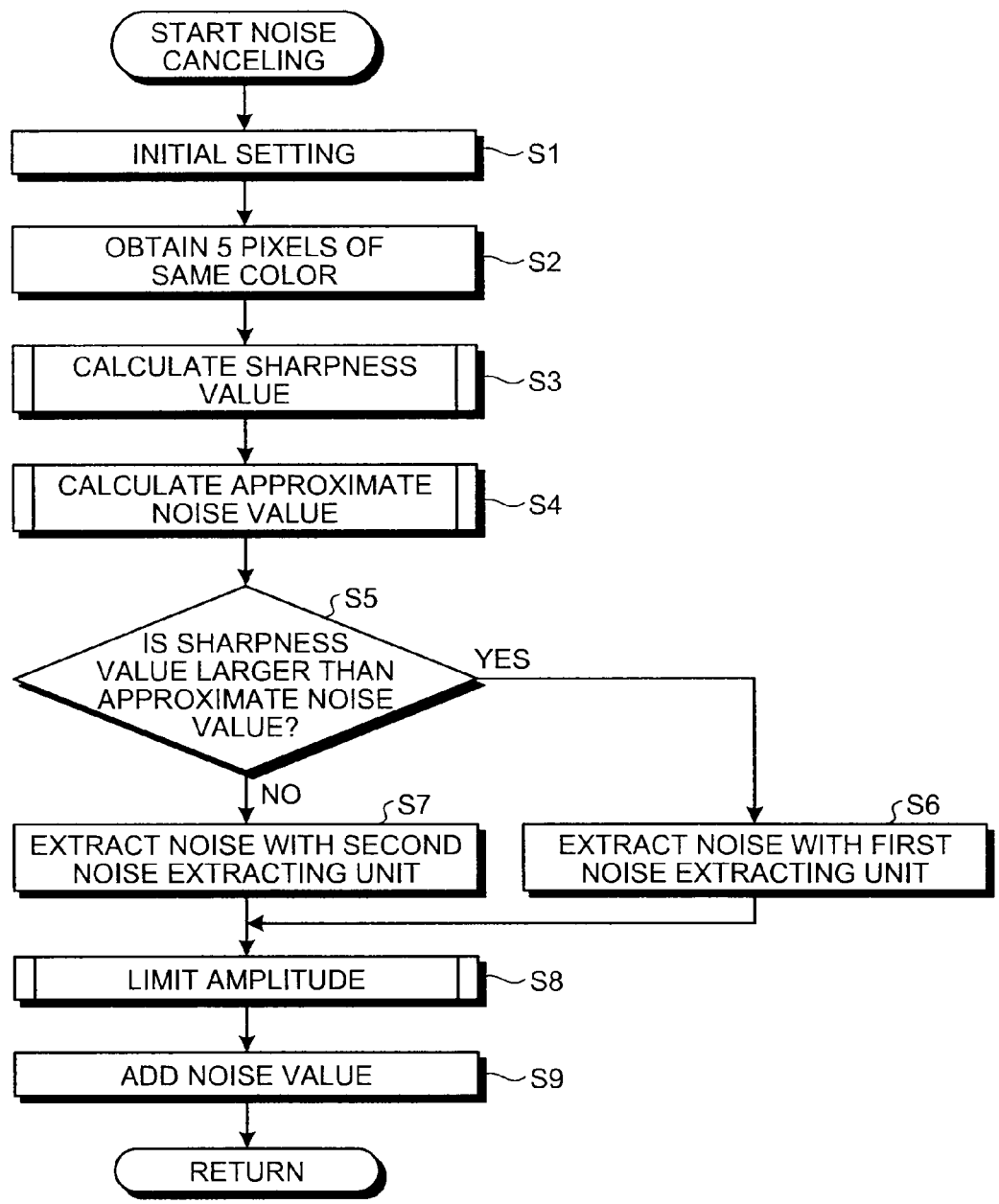
FIG. 4 is a flowchart for explaining an operation of the first noise canceling unit according to the first embodiment.

An operation of the first noise canceling unit 40 thus configured is explained next. FIG. 4 is a flowchart of an operation of the first noise canceling unit 40.

With reference to FIG. 4, when the noise canceling is started, the first noise canceling unit 40 performs initial setting to obtain Noise_MP (Step S1). The nonlinear processor 401, the Ave calculator 403, and the multiplexer 407 obtain the target pixel and the four close pixels with respect to the target pixel (Step S2). The first noise canceling unit 40 has no line memory that stores therein pixel values, and accordingly these constituent elements obtain the pixel values of five pixels from among pixel values that are sequentially inputted in the order of the Bayer arrangement by shifting the timing.

The nonlinear processor 401 and the sharpness calculator 402 calculate the sharpness value based on the obtained pixel values of the target pixel and the four close pixels (Step S3). The Ave calculator 403 and the approximate noise calculator 404 calculate the approximate noise value based on the obtained pixel values of the target pixel and the four close pixels, and the multiplier 405 multiplies the approximate noise value by Noise_MP to adjust the approximate noise value (Step S4).

The comparator 406 then compares the sharpness value and the adjusted approximate noise value (Step S5). When the sharpness value is larger than the approximate noise value (YES at Step S5), the comparator 406 sets the flag to "0", the multiplexer 407 transmits the obtained pixel values of the target pixel and the four close pixels to the first noise extracting unit 408, and the first noise extracting unit 408 extracts the noise value of the transmitted target pixel (Step S6).

When the sharpness value is equal to or smaller than the approximate noise value (NO at Step S5), the comparator 406 sets the flag to "1", the multiplexer 407 transmits the obtained pixel values of the target pixel and the four close pixels to the second noise extracting unit 409, and the second noise extracting unit 409 extracts the noise value of the transmitted target pixel (Step S7).

The amplitude limiting unit 410 limits the amplitude of the extracted noise value based on the adjusted approximate noise value (Step S8), and the adder 411 adds the amplitude-limited noise value to the pixel value of the target pixel (Step S9).

As described above, the first noise canceling unit 40 determines whether the neighborhood of the target pixel is a sharp part or a flat part based on the pixel array in the H direction. The first noise canceling unit 40 performs the noise canceling having such characteristics that the sharpness is kept as much as possible when the neighborhood of the target pixel is a sharp part, and performs the noise canceling having such characteristics that the pixel values of wider frequency components are flattened when the neighborhood is a flat part. In this way, the first noise canceling unit 40 can provide the noise canceling that does not reduce the sense of resolution while suppressing attenuation of the sharp part. That is, the first noise canceling unit 40 can achieve the noise canceling while preventing deterioration of the image quality.

Figure 5A:
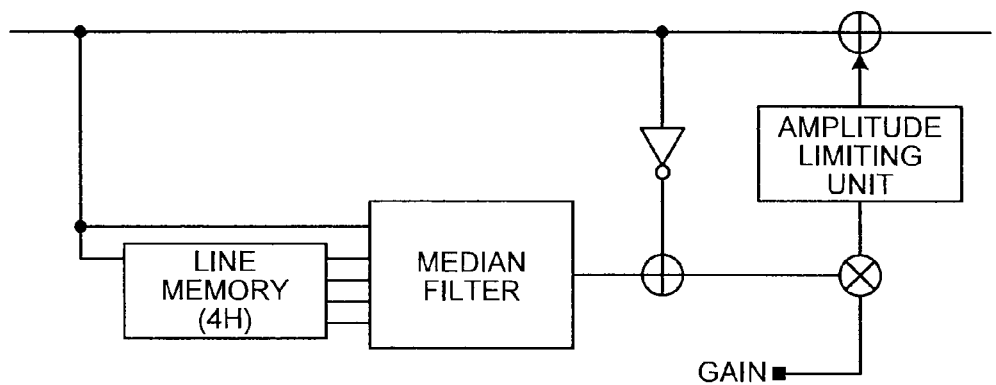
FIGS. 5A and 5B are schematic diagrams for explaining an example of a configuration of a second noise canceling unit.

A configuration of the second noise canceling unit 43 is explained next. FIG. 5A is a block diagram of an example of the configuration of the second noise canceling unit 43.

Figure 5B:
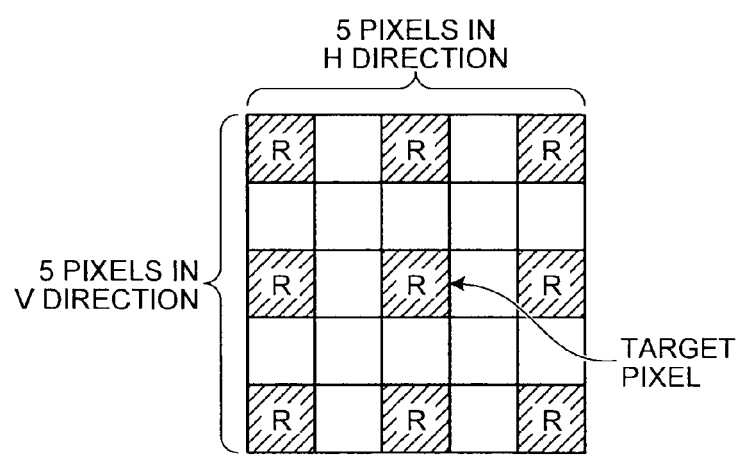

As shown in FIG. 5A, the second noise canceling unit 43 uses a 4H line memory. The second noise canceling unit 43 obtains pixel values of nine pixels of the same color including the target pixel from a pixel arrangement of "5 pixels in H direction×5 pixels in V direction" as shown in FIG. 5B in a total of five lines including the line memory and a target line. The second noise canceling unit 43 then performs median processing for the obtained pixel values to retrieve a median. The second noise canceling unit 43 extracts negative noise by obtaining a difference between the retrieved median and the pixel value of the target pixel, multiplies the noise by a predetermined gain, limits the amplitude of the resultant noise, and adds again the amplitude-limited noise to the pixel value of the target pixel. In this way, the second noise canceling unit 43 performs the noise canceling.

With this configuration, the second noise canceling unit 43 can provide the processing in view of the pixel array in the V direction, in addition to the pixel array in the H direction. Therefore, the second noise canceling unit 43 can suppress the deterioration in the sense of resolution and achieve highly-precise noise canceling. However, the second noise canceling unit 43 is larger in circuit scale because it needs to use the line memory. On the other hand, the first noise canceling unit 40 has no line memory. Accordingly, the first noise canceling unit 40 is smaller in circuit scale and power consumption than the second noise canceling unit 43 and can achieve the noise canceling that suppresses the deterioration in the image quality as described above. Therefore, the first noise canceling unit 40 can be provided at the first stage in the image processor 4 separately from the second noise canceling unit 43, as shown in the configuration of the solid-state imaging device according to the first embodiment.

As described above, according to the first embodiment, with respect to the pixel values of the digital imaging signal inputted in the order corresponding to the arrangement in the image pickup device, whether the neighborhood of the target pixel is a sharp part or a flat part is determined based on the pixel values of the target pixel and a predetermined number of pixels inputted immediately before and after the target pixel, and the different noise canceling can be performed according to the result of the determination. Therefore, the noise canceling circuit that has a small circuit scale and performs the noise canceling while suppressing the deterioration in the image quality can be provided.

A solid-state imaging device according to a second embodiment of the present invention is explained next. The second embodiment is different from the first embodiment in a configuration of components functioning as a noise extracting unit. A configuration and an operation of a first noise canceling unit according to the second embodiment, which is denoted by reference numeral 50, are explained.

Figure 6:
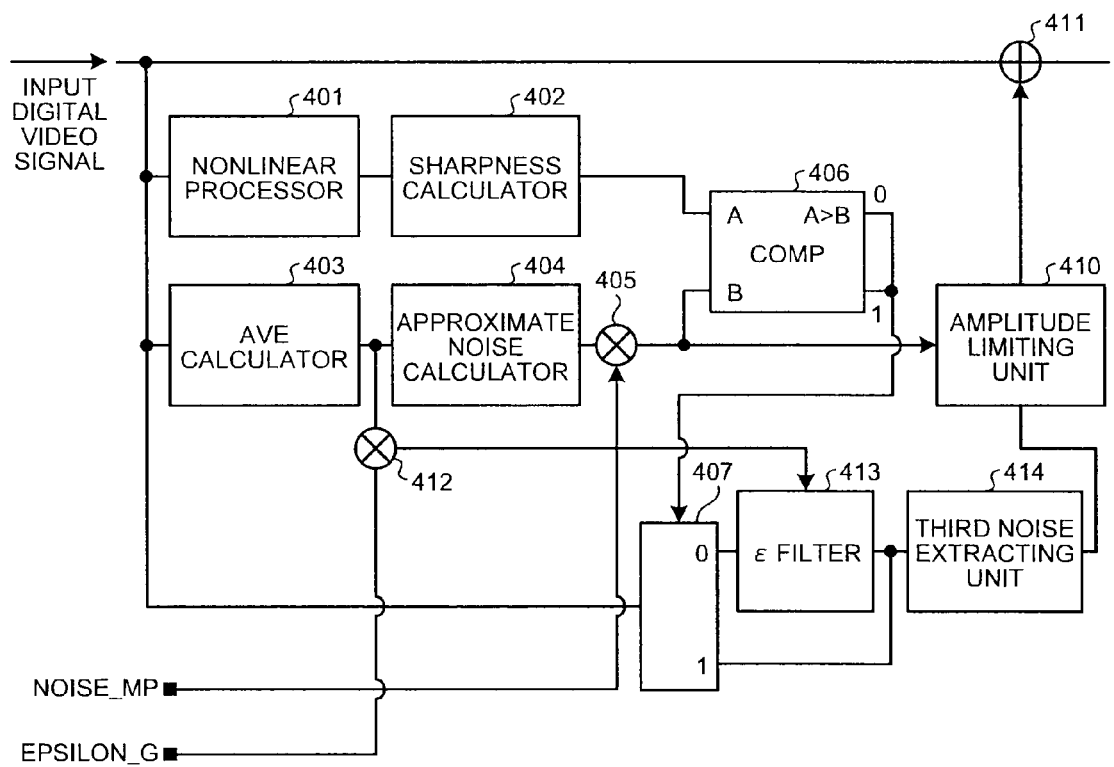
FIG. 6 is a block diagram of a configuration of a first noise canceling unit according to a second embodiment of the present invention.

FIG. 6 is a block diagram of a configuration of the first noise canceling unit 50. Constituent elements of the first noise canceling unit 50 having like functions as those in the first embodiment are denoted by like reference numerals, and detailed explanations thereof will be omitted.

The first noise canceling unit 50 includes the nonlinear processor 401, the sharpness calculator 402, the Ave calculator 403, a multiplier 412, the approximate noise calculator 404, the multiplier 405, the comparator 406, the multiplexer 407, an epsilon ($\epsilon$) filter 413, a third noise extracting unit 414, the amplitude limiting unit 410, and the adder 411.

The $\epsilon$ filter 413 is used when the comparator 406 sets the flag to "0", that is, when the neighborhood of the target pixel is determined to be a sharp part. The $\epsilon$ filter 413 performs masking to enable the third noise extracting unit 414 at a subsequent stage to remove noise while maintaining a sharp part. Specifically, the $\epsilon$ filter 413 compares each of the pixel values of the target pixel and the four close pixels with a threshold $\epsilon$, and replaces the pixel value of a pixel exceeding the threshold $\epsilon$ with the pixel value of the target pixel.

The multiplier 412 multiplies the average of the pixel values of the target pixel and the four close pixels calculated in the Ave calculator 403 by a setting factor (Epsilon_G) for $\epsilon$ calculation, which is a value larger than one and previously provided by the setting register or the like, thereby calculating the threshold $\epsilon$, and transmits the calculated threshold $\epsilon$ to the $\epsilon$ filter 413.

The third noise extracting unit 414 can use any noise filter having characteristics for flattening pixel values of wider frequency components. For example, the third noise extracting unit 414 can use the same noise filter as that of the second noise extracting unit 409. Even when the target pixel and the four close pixels determined to be a sharp part are inputted to the third noise extracting unit 414 having the same configuration as that of the second noise extracting unit 409, the $\epsilon$ filter 413 at the previous stage masks the pixels that have values sharply changing and exceeding the average. Accordingly, the noise value is extracted without deteriorating the sharpness after correction even when the noise extraction having characteristics for flattening the pixel values of the wider frequency components is performed.

Figure 7:
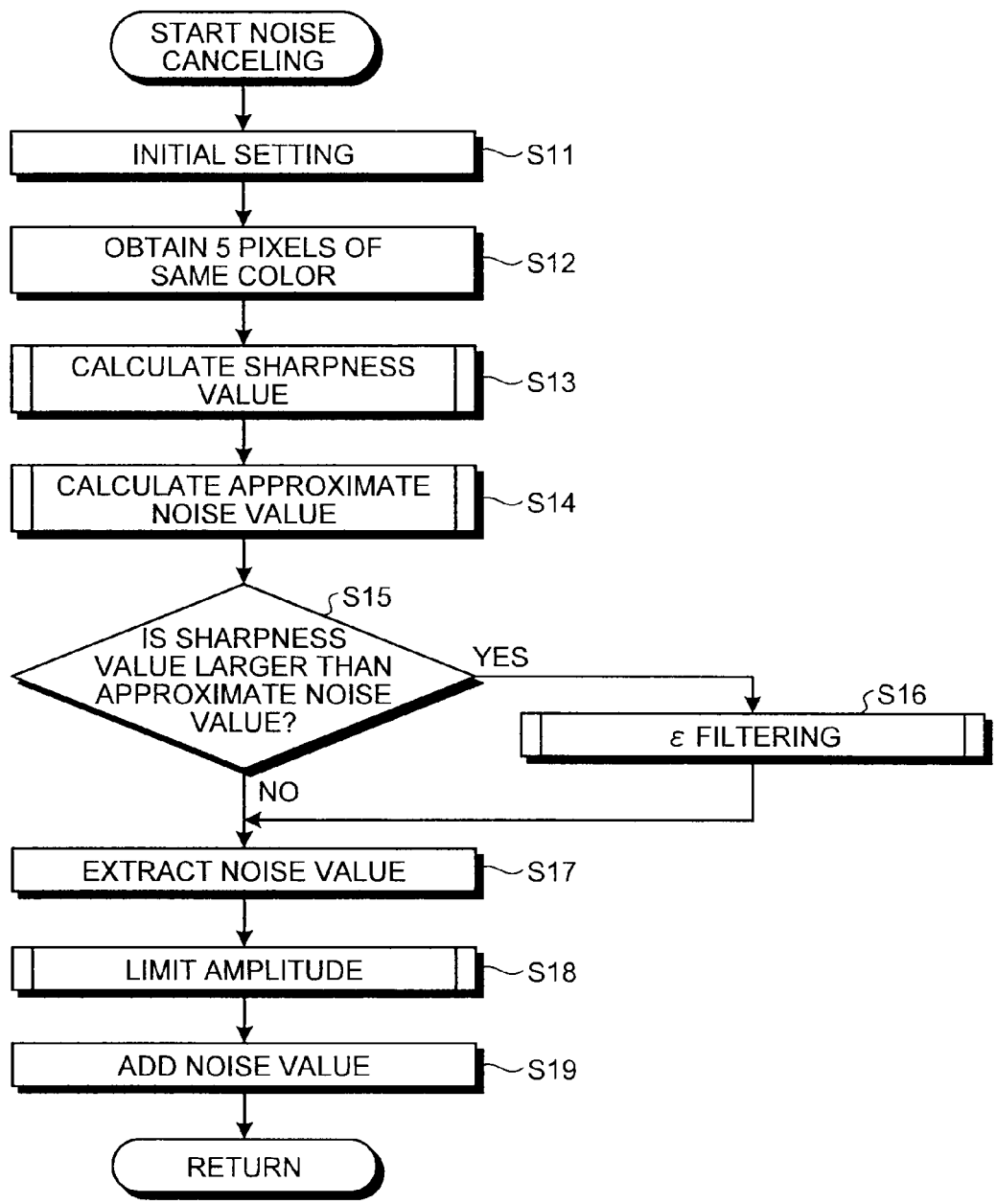
FIG. 7 is a flowchart for explaining an operation of the first noise canceling unit according to the second embodiment.

An operation of the first noise canceling unit 50 according to the second embodiment thus configured is explained. FIG. 7 is a flowchart of an operation according to the second embodiment. With reference to FIG. 7, the first noise canceling unit 50 first performs initial setting to obtain Noise_MP and Epsilon_G (Step S11). The first noise canceling unit 50 then performs equivalent processes to those at Steps S2 to S4 in the first embodiment, at Steps S12 to S14.

The comparator 406 then compares the sharpness value and the adjusted approximate noise value (Step S15). When the sharpness value is larger than the approximate noise value (YES at Step S15), the comparator 406 sets the flag to "0", the multiplexer 407 transmits the obtained pixel values of the target pixel and the four close pixels to the $\epsilon$ filter 413, and the $\epsilon$ filter 413 masks the transmitted pixel values of the target pixel and the four close pixels by using the threshold $\epsilon$ obtained by the multiplier 412 that multiplies the average calculated in the Ave calculator 403 by Epsilon_G (Step S16). The third noise extracting unit 414 extracts the noise value of the target pixel after the masking (Step S17).

When the sharpness value is equal to or smaller than the approximate noise value (NO at Step S15), the comparator 406 sets the flag to "1", the multiplexer 407 transmits the obtained pixel values of the target pixel and the four close pixels to the third noise extracting unit 414, and proceeds to Step S17. At Step S17, the third noise extracting unit 414 extracts the noise value of the transmitted target pixel.

The amplitude limiting unit 410 then performs the amplitude limitation on the extracted noise value based on the adjusted approximate noise value (Step S18), and the adder 411 adds the amplitude-limited noise value to the pixel value of the target pixel (Step S19).

In the above explanations, Epsilon_G is larger than 1, and the $\epsilon$ filter 413 replaces the pixel value of a pixel larger than the threshold $\epsilon$ with the pixel value of the target pixel. However, it is possible that Epsilon_G is set to a value smaller than 1 and the $\epsilon$ filter 413 replaces the pixel value of a pixel smaller than the threshold $\epsilon$ with the pixel value of the target pixel. Two values, one of which is larger than 1 and the other of which is smaller than 1, can be set as Epsilon_G. In this case, the $\epsilon$ filter 413 can replace the pixel value of a pixel larger than a larger threshold $\epsilon$, which is one of two thresholds $\epsilon$ corresponding to the two values of Epsilon_G, and the pixel value of a pixel smaller than a smaller threshold $\epsilon$, with the pixel value of the target pixel.

As described above, according to the second embodiment, the noise extraction for the sharp part is performed after application of the $\epsilon$ filter, and the noise extraction for the flat part is performed without application of the $\epsilon$ filter. Therefore, the noise canceling can be performed without deteriorating the sharpness. That is, the noise canceling circuit in a small circuit scale that can perform the noise canceling while preventing the deterioration in the image quality can be provided. Further, the threshold $\epsilon$ to be used in the $\epsilon$ filter is calculated by multiplying the average pixel value of the pixels in a noise extraction target range by the setting factor for threshold calculation. Therefore, the threshold value $\epsilon$ is changed according to the values of pixels near the target pixel, which provides a highly-precise noise extraction.

A solid-state imaging device according to a third embodiment of the present invention is explained next. The third embodiment is different from the second embodiment in a configuration of components functioning as a correcting unit. A configuration and an operation of a first noise canceling unit according to the third embodiment, which is denoted by reference numeral 60, are explained.

Figure 8:
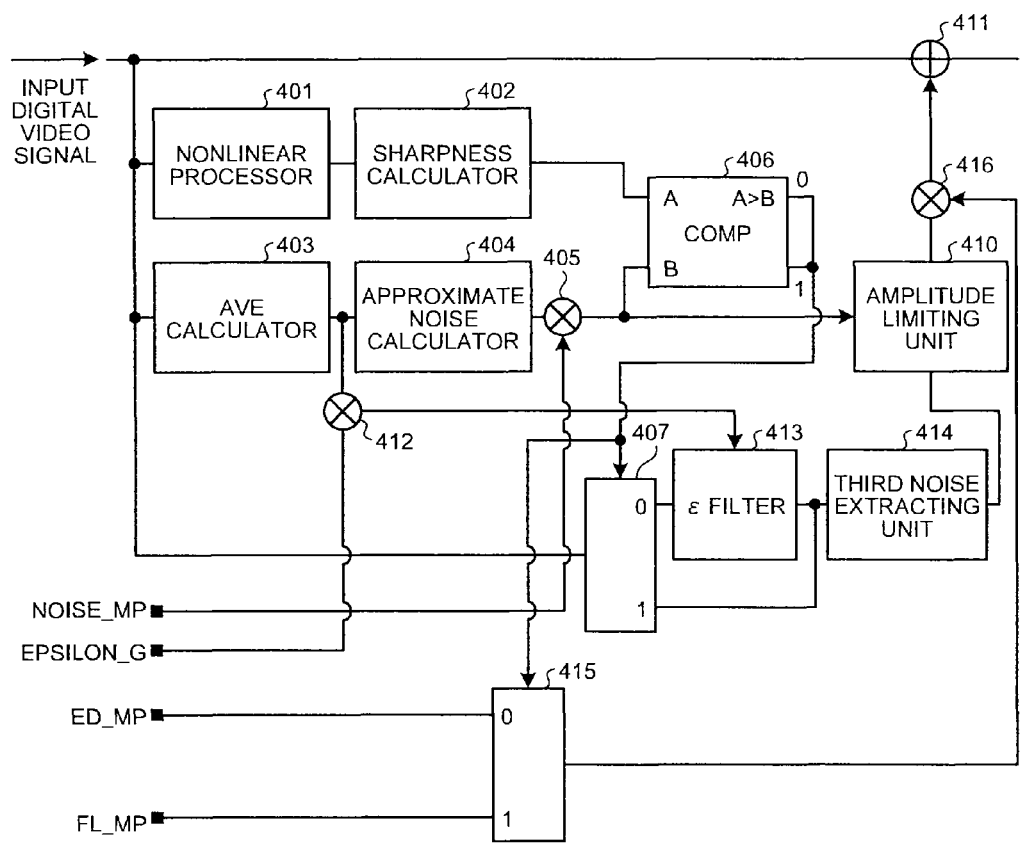
FIG. 8 is a block diagram of a configuration of a first noise canceling unit according to a third embodiment of the present invention.

FIG. 8 is a block diagram of a configuration of the first noise canceling unit 60. Constituent elements of the first noise canceling unit 60 having like functions as those in the second embodiment are denoted by like reference numerals, and detailed explanations thereof will be omitted.

As shown in FIG. 8, the first noise canceling unit 60 further includes a demultiplexer 415 and a multiplier 416, in addition to the configuration of the second embodiment, to additionally perform final adjustment of the noise value used for the correction.

The multiplier 416 multiplies the noise value amplitude limited in the amplitude limiting unit 410 by an adjusting factor selected by the demultiplexer 415, and transmits a resultant value to the adder 411.

The demultiplexer 415 selects the adjusting factor to be multiplied by the multiplier 416 based on the determination whether the neighborhood of the target pixel is a sharp part or a flat part. That is, the first noise canceling unit 60 previously sets two adjusting factors, an adjusting factor ED_MP to be multiplied when the neighborhood is determined to be a sharp part, and an adjusting factor FL_MP to be multiplied when the neighborhood is determined to be a flat part, in the setting register or the like. The demultiplexer 415 selects ED_MP and transmits the selected ED_MP to the multiplier 416 when the flag is "0". The demultiplexer 415 selects FL_MP and transmits the selected FL_MP to the multiplier 416 when the flag is "1".

Each of the adjusting factors is set to a value smaller than 1 to reduce the intensity of the correction when details are to be emphasized and even a little loss of the sharpness is not desired, for example when the third embodiment is applied to a top-of-the-line product. When the third embodiment is applied to a camera mounted with a lens having relatively lower resolution, which is for example mounted on a mobile phone, each of the adjusting factors is set to a value larger than 1 to perform larger correction. The two adjusting factors can be set separately, and therefore the setting flexibility becomes greater than in the case that the extracted noise value is uniformly changed by one adjusting factor, resulting in more preferable setting.

Figure 9:
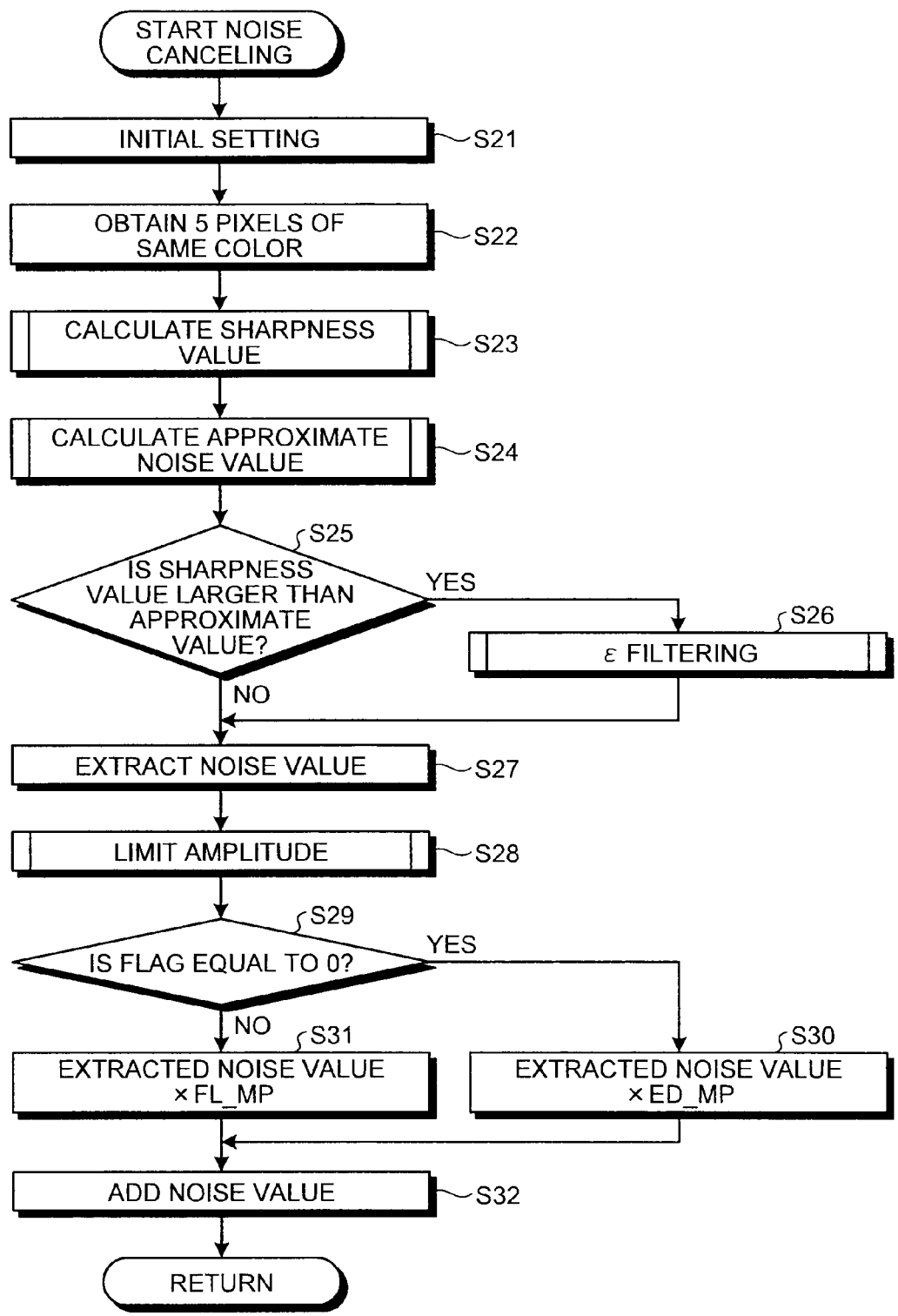
FIG. 9 is a flowchart for explaining an operation of the first noise canceling unit according to the third embodiment.

An operation according to the third embodiment is explained next. FIG. 9 is a flowchart of an operation according to the third embodiment. With reference to FIG. 9, the first noise canceling unit 60 first performs initial setting to obtain Noise_MP, Epsilon_G, ED_MP, and FL_MP (Step S21). The first noise canceling unit 60 then performs equivalent processes to those at Steps S12 to S18 in the second embodiment, at Steps S22 to S28.

The demultiplexer 415 then determines whether the flag is "0" (Step S29). When the flag is "0" (YES at Step S29), the demultiplexer 415 transmits ED_MP to the multiplier 416, and the multiplier 416 multiplies the extracted noise value by ED_MP (Step S30). When the flag is "1" (NO at Step S29), the demultiplexer 415 transmits FL_MP to the multiplier 416, and the multiplier 416 multiplies the extracted noise value by FL_MP (Step S31).

The adder 411 adds the noise value multiplied by ED_MP or FL_MP to the pixel value of the target pixel (Step S32).

According to the third embodiment, the extracted noise value of the target pixel is multiplied by the different factors previously provided in the cases where the neighborhood of the target pixel is determined to be a flat part and a sharp part, respectively. Therefore, an amount of the noise canceling can be appropriately adjusted according to product specifications.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A noise canceling circuit that takes an image of a subject incident through an imaging lens by means of an image pickup device, generates a digital video signal based on an imaging signal, and sequentially performs noise canceling of pixel values of the digital video signal, the noise canceling circuit comprising:
    a sharp/flat-part determining unit that determines whether a neighborhood of a target pixel in the digital video signal is a sharp part or a flat part by calculating a sharpness value indicating sharpness and an approximate noise value approximately indicating a noise value included in the target pixel, based on pixel values of the target pixel and a predetermined number of pixels inputted immediately before and after the target pixel, and comparing the sharpness value and the approximate noise value;
    a noise extracting unit that extracts the noise value of the target pixel by selecting one of two noise extractions each using a one-dimensional filter according to a result of the determination performed by the sharp/flat-part determining unit and performing the selected noise extraction to the target pixel and the predetermined number of the pixels inputted immediately before and after the target pixel; and
    a correcting unit that corrects the pixel value of the target pixel by using the extracted noise value of the target pixel.

2. The noise canceling circuit according to claim 1, wherein the sharpness value is based on absolute values of differences between the pixel value of the target pixel and the respective pixel values of the predetermined number of the pixels inputted immediately before and after the target pixel, which have been nonlinearly converted based on a predetermined spectral luminous efficiency.

3. The noise canceling circuit according to claim 1, wherein the approximate noise value is based on a square root of an average of the pixel value of the target pixel and the pixel values of the predetermined number of the pixels inputted immediately before and after the target pixel.

4. The noise canceling circuit according to claim 1, wherein the approximate noise value is calculated based on an average of the pixel value of the target pixel and the pixel values of the predetermined number of the pixels inputted immediately before and after the target pixel, and shot noise characteristics of the image pickup device previously obtained.

5. The noise canceling circuit according to claim 1, wherein the noise extracting unit extracts the noise value by using a noise extraction filter after applying an epsilon filter when the neighborhood of the target pixel is a sharp part, and extracts the noise value by using a noise extraction filter without applying the epsilon filter when the neighborhood of the target pixel is a flat part.

6. The noise canceling circuit according to claim 5, wherein a threshold to be used by the epsilon filter is obtained by multiplying an average of the pixel values of the target pixel and the predetermined number of the pixels inputted immediately before and after the target pixel by a gain previously provided.

7. The noise canceling circuit according to claim 1, further comprising a noise-value adjusting unit that multiplies the noise value extracted by the noise extracting unit by different factors previously provided in a case that the neighborhood of the target pixel is determined to be a flat part and a case that the neighborhood of the target pixel is determined to be a sharp part, respectively, wherein
    the correcting unit corrects the pixel value of the target pixel by using the noise value multiplied by the factor by the noise-value adjusting unit.

8. A noise canceling method of taking an image of a subject incident through an imaging lens by means of an image pickup device, generating a digital video signal based on an imaging signal, and sequentially performing noise canceling of pixel values of the digital video signal, the noise canceling method comprising:
    calculating a sharpness value indicating sharpness and an approximate noise value approximately indicating a noise value included in the target pixel, based on pixel values of a target pixel in the digital video signal and a predetermined number of pixels inputted immediately before and after the target pixel;
    determining whether a neighborhood of the target pixel is a sharp part or a flat part by comparing the sharpness value and the approximate noise value;
    extracting the noise value of the target pixel by selecting one of two noise extractions each using a one-dimensional filter according to whether the neighborhood of the target pixel is a sharp part or a flat part, and performing the selected noise extraction to the target pixel and the predetermined number of the pixels inputted immediately before and after the target pixel; and
    correcting the pixel value of the target pixel by using the extracted noise value of the target pixel.

9. The noise canceling method according to claim 8, wherein the sharpness value is based on absolute values of differences between the pixel value of the target pixel and the respective pixel values of the predetermined number of the pixels inputted immediately before and after the target pixel, which have been nonlinearly converted based on a predetermined spectral luminous efficiency.

10. The noise canceling method according to claim 8, wherein the approximate noise value is based on a square root of an average of the pixel value of the target pixel and the pixel values of the predetermined number of the pixels inputted immediately before and after the target pixel.

11. The noise canceling method according to claim 8, wherein the approximate noise value is calculated based on an average of the pixel value of the target pixel and the pixel values of the predetermined number of the pixels inputted immediately before and after the target pixel, and shot noise characteristics of the image pickup device previously obtained.

12. The noise canceling method according to claim 8, wherein the noise value is extracted by using a noise extraction filter after applying an epsilon filter when the neighborhood of the target pixel is a sharp part, and the noise value is extracted by using a noise extraction filter without applying the epsilon filter when the neighborhood of the target pixel is a flat part.

13. The noise canceling method according to claim 12, wherein a threshold to be used by the epsilon filter is obtained by multiplying an average of the pixel values of the target pixel and the predetermined number of the pixels inputted immediately before and after the target pixel by a gain previously provided.

14. The noise canceling method according to claim 8, further comprising:
multiplying the extracted noise value by different factors previously provided in a case that the neighborhood of the target pixel is determined to be a flat part and a case that the neighborhood of the target pixel is determined to be a sharp part, respectively; and
correcting the pixel value of the target pixel by using the noise value multiplied by the factor.

15. A solid-state imaging device that takes an image of a subject incident through an imaging lens by means of an image pickup device, generates a digital video signal based on an imaging signal, and performs image processing of the generated digital video signal by means of an image processor, wherein
the image processor comprises:
a first noise canceling circuit that is provided at a first stage of the image processor to sequentially perform noise canceling of pixel values of the digital video signal; and
a second noise canceling circuit that is provided at a subsequent stage to the first noise canceling circuit to store the pixel values of the digital video signal inputted through the first noise canceling circuit in a line memory, and to perform noise canceling of the stored pixel values by using a two-dimensional filter, wherein
the first noise canceling circuit comprises:
a sharp/flat-part determining unit that determines whether a neighborhood of a target pixel in the digital video signal is a sharp part or a flat part by calculating a sharpness value indicating sharpness and an approximate noise value approximately indicating a noise value included in the target pixel, based on pixel values of the target pixel and a predetermined number of pixels inputted immediately before and after the target pixel, and comparing the sharpness value and the approximate noise value;
a noise extracting unit that extracts the two noise value of the target pixel by selecting one of two noise extractions each using a one-dimensional filter according to a result of the determination performed by the sharp/flat-part determining unit and performing the selected noise extraction to the target pixel and the predetermined number of the pixels inputted immediately before and after the target pixel; and
a correcting unit that corrects the pixel value of the target pixel by using the extracted noise value of the target pixel.

16. The solid-state imaging device according to claim 15, wherein the sharpness value is based on absolute values of differences between the pixel value of the target pixel and the respective pixel values of the predetermined number of the pixels inputted immediately before and after the target pixel, which have been nonlinearly converted based on a predetermined spectral luminous efficiency.

17. The solid-state imaging device according to claim 15, wherein the approximate noise value is either based on a square root of an average of the pixel value of the target pixel and the pixel values of the predetermined number of the pixels inputted immediately before and after the target pixel, or calculated based on the average and shot noise characteristics of the image pickup device previously obtained.

18. The solid-state imaging device according to claim 15, wherein the noise extracting unit extracts the noise value by using a noise extraction filter after applying an epsilon filter when the neighborhood of the target pixel is a sharp part, and extracts the noise value by using a noise extraction filter without applying the epsilon filter when the neighborhood of the target pixel is a flat part.

19. The solid-state imaging device according to claim 18, wherein a threshold to be used by the epsilon filter is obtained by multiplying an average of the pixel values of the target pixel and the predetermined number of the pixels inputted immediately before and after the target pixel by a gain previously provided.

20. The solid-state imaging device according to claim 15, wherein
the first noise canceling circuit further comprises a noise-value adjusting unit that multiplies the noise value extracted by the noise extracting unit by different factors previously provided in a case that the neighborhood of the target pixel is determined to be a flat part and a case that the neighborhood of the target pixel is determined to be a sharp part, respectively, and
the correcting unit corrects the pixel value of the target pixel by using the noise value multiplied by the factor by the noise-value adjusting unit.

* * * * *